(12) United States Patent
Huang et al.

(10) Patent No.: US 8,788,858 B2
(45) Date of Patent: Jul. 22, 2014

(54) NETWORK DEVICE AND NETWORK CONNECTING METHOD FOR SUPPORTING POWER SAVING MECHANISM THROUGH AUTO-NEGOTIATION OF HDMI

(75) Inventors: Liang-Wei Huang, Hsinchu (TW);
Shieh-Hsing Kuo, Hsinchu (TW);
Ming-Feng Hsu, New Taipei (TW);
Yuan-Jih Chu, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 307 days.

(21) Appl. No.: 13/305,746

(22) Filed: Nov. 29, 2011

(65) Prior Publication Data

US 2012/0137151 A1 May 31, 2012

(30) Foreign Application Priority Data

Nov. 29, 2010 (TW) .............................. 99141246 A (51) Int. Cl.
*G06F 1/32* (2006.01)
*G06F 1/00* (2006.01)
*G06F 15/16* (2006.01)

(52) U.S. Cl.
USPC ........................... 713/321; 713/300; 709/233

(58) Field of Classification Search
USPC ........................................................ 713/321
See application file for complete search history.

(56) References Cited

U.S. PATENT DOCUMENTS

| | | | | |
|---|---|---|---|---|
| 6,442,174 B1* | 8/2002 | Lin | ................... | 370/466 |
| 6,463,542 B1* | 10/2002 | Yu et al. | ................... | 713/320 |
| 6,965,578 B1* | 11/2005 | Kappes | ................... | 370/286 |
| 6,993,667 B1* | 1/2006 | Lo | ................... | 713/320 |
| 7,127,521 B2* | 10/2006 | Hsu et al. | ................... | 709/233 |
| 7,652,483 B2 | 1/2010 | Huang | | |
| 7,971,080 B2* | 6/2011 | Yee | ................... | 713/320 |
| 8,195,247 B2* | 6/2012 | Lee et al. | ................... | 455/574 |
| 8,364,991 B2* | 1/2013 | Lida et al. | ................... | 713/320 |
| 2002/0157030 A1* | 10/2002 | Barker et al. | ................... | 713/320 |
| 2008/0100304 A1 | 5/2008 | Huang | | |
| 2008/0292007 A1 | 11/2008 | Lida | | |
| 2010/0262851 A1* | 10/2010 | Chien | ................... | 713/320 |
| 2010/0289945 A1 | 11/2010 | Kobayashi | | |
| 2010/0325677 A1* | 12/2010 | Yu et al. | ................... | 725/109 |

FOREIGN PATENT DOCUMENTS

| | | |
|---|---|---|
| TW | M308589 | 3/2007 |
| TW | 200820673 | 5/2008 |
| TW | 201032572 | 9/2010 |

* cited by examiner

*Primary Examiner* — Suresh Suryawanshi
(74) *Attorney, Agent, or Firm* — Winston Hsu; Scott Margo (57) ABSTRACT

A network device, for supporting a power saving mechanism through an auto-negotiation of HDMI, includes a transmitting circuit and a receiving circuit. The transmitting circuit is arranged for generating a link pulse signal to a second network device, wherein the network device and the second network device perform the auto-negotiation of a network connection by using the link pulse signal through HDMI in order to support the power saving mechanism. After the receiving circuit of the network device receives another link pulse signal transmitted from the second network device through HDMI, the network device is controlled to be operated under the power saving mechanism.

20 Claims, 9 Drawing Sheets

NETWORK DEVICE AND NETWORK CONNECTING METHOD FOR SUPPORTING POWER SAVING MECHANISM THROUGH AUTO-NEGOTIATION OF HDMI

BACKGROUND

1. Technical Field

The disclosure relates to a network device for supporting a power saving mechanism through an auto-negotiation.

2. Description of the Related Art

When a first application circuit and a second application circuit of a network system are connected to each other through a network medium, the first application circuit and the second application circuit are not always in a data interchange state. For example, during a certain period of time, the first application circuit may continuously receive data from the second application circuit without transmitting any data to the second application circuit, or there may be no data transmitted or received between the first application circuit and the second application circuit. In order to save power in such a data transmission system, when one application circuit does not transmit or receive any data, its corresponding transmitting circuit or receiving circuit should maintain a power saving mode. In more detail, when there is little data transmitted between the first application circuit and the second application circuit, both the first application circuit and the second application circuit could adopt an energy-efficient transmission mode, i.e. a data transmission rate with a lower frequency. The power saving mechanism of the first application circuit and the second application circuit may not be the same, however, making the circuits incompatible, or one of the application circuits may not have any power saving mechanism. For these reasons, when one of the application circuits (e.g. the first application circuit) meets the power saving condition (it is not in the state of receiving data), the first application circuit and the second application circuit cannot set the receiving circuit of the first application circuit to enter a low-power mode based on a predetermined standard procedure.

Moreover, when the receiving circuits of the first application circuit and the second application circuit are both in the low-power mode (a sleep mode, for example), the transmitting circuit of the first application circuit may transmit a trigger signal to the receiving circuit of the second application circuit through the data transmission medium if the transmitting circuit desires to wake up the receiving circuit of the second application circuit from the sleep mode. When the trigger signal reaches the receiving circuit of the second application circuit, however, an echo may rebound, reaching the receiving circuit of the first application circuit such that the receiving circuit of the first application circuit will be erroneously woken up from the sleep mode by the echo. Since the receiving circuit of the first application circuit should maintain the sleep mode continuously, the predetermined standard wake-up procedure of the data transmission system may have errors when the receiving circuit of the first application circuit is erroneously woken up by the echo, and this could influence the flowing data transmission.

In addition, the power saving mechanism of the conventional network systems complies with IEEE 802.3az Energy Efficient Ethernet standard (EEE) defined by the Institute of Electrical and Electronic Engineers (IEEE). The IEEE standard also defines that the power saving mechanism must be implemented in a control circuit through an auto-negotiation (NWAY) defined by IEEE. In other words, in the IEEE standard, a control circuit without the auto-negotiation cannot execute the power saving mechanism as defined by IEEE. Network devices supporting High Definition Multimedia Interface (HDMI) currently fail to support auto-negotiation. Hence, how to support the power saving mechanism defined by IEEE through an auto-negotiation of HDMI, and how to reduce interference caused by echoes have become important issues to be solved in this field.

BRIEF SUMMARY

It is therefore one of the objectives of the present disclosure to provide a network device and a method for supporting a power saving mechanism through an auto-negotiation of High Definition Multimedia Interface (HDMI) in order to solve the above-mentioned problems of the related art.

With reference to one aspect of the present disclosure, an exemplary network device for supporting a power saving mechanism through an auto-negotiation of HDMI is provided. The network device may include a transmitting circuit and a receiving circuit. The transmitting circuit is arranged for generating a link pulse signal to a second network device, wherein the network device and the second network device perform auto-negotiation of a network connection by using the link pulse signal through HDMI in order to support the power saving mechanism. The transmitting circuit is arranged for generating a link pulse signal to a second network device, wherein the network device and the second network device perform the auto-negotiation of a network connection by using the link pulse signal through HDMI in order to support the power saving mechanism.

With reference to another aspect of the present disclosure, an exemplary network connecting method, applied to a network device for supporting a power saving mechanism through an auto-negotiation of HDMI is provided. The method includes the following steps: generating a link pulse signal to a second network device, wherein the network device and the second network device perform the auto-negotiation of a network connection by using the link pulse signal through HDMI in order to support the power saving mechanism; and after a second link pulse signal transmitted from the second network device is received through HDMI, controlling the network device to be operated under the power saving mechanism.

A function of launching an auto-negotiation mechanism by using a self-defined link pulse signal is provided in the present disclosure. Therefore, a power saving mechanism defined by the Institute of Electrical and Electronic Engineers (IEEE) can be supported through HDMI. In addition, an echo cancellation can be performed in order to eliminate echoes caused by the link pulse signal, such that erroneous judgment rates can be reduced and the accuracy of determining the link pulse signal outputted from another network device can be improved.

These and other objectives of the disclosure will no doubt become obvious to those of ordinary skill in the art after reading the following detailed description of the embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
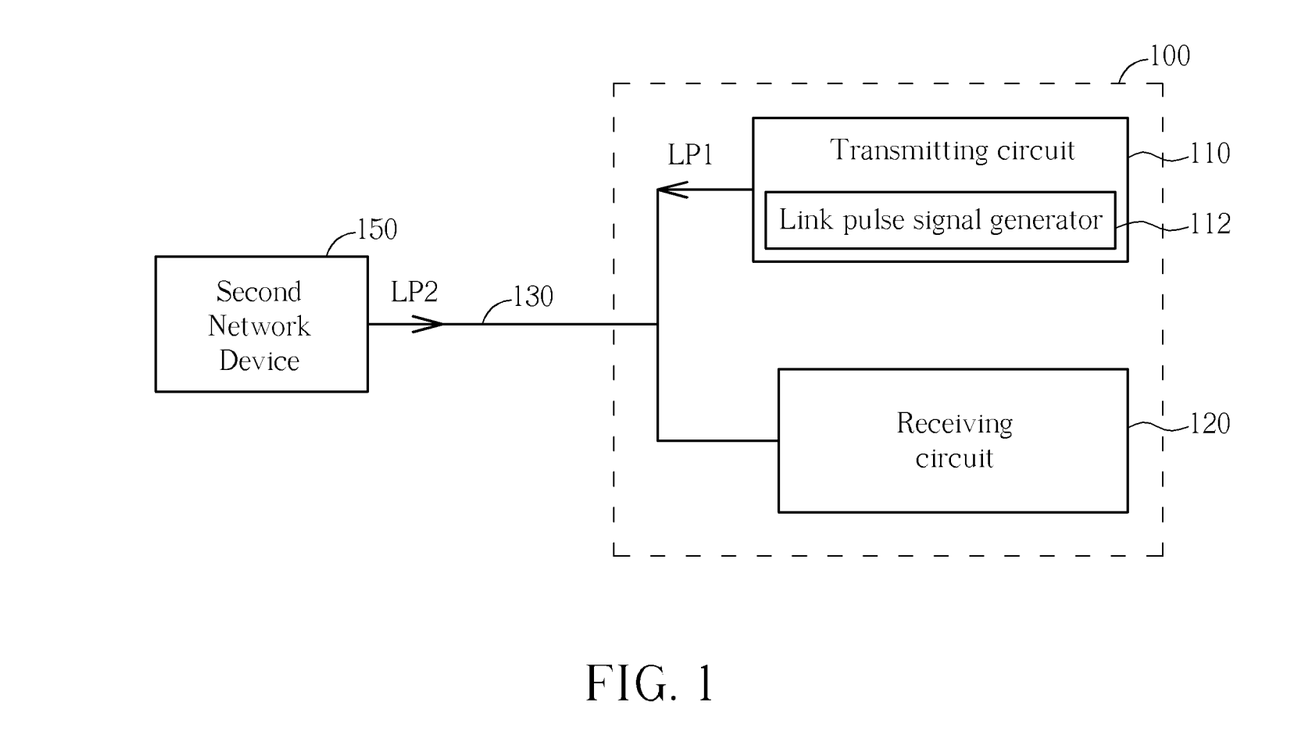
FIG. 1 is a diagram of a network device for supporting a power saving mechanism through an auto-negotiation of HDMI with reference to a first embodiment.

Please refer to FIG. 1. FIG. 1 is a diagram of a network device 100 for supporting a power saving mechanism through an auto-negotiation (NWAY) of HDMI with reference to a first embodiment. As shown in FIG. 1, the network device 100 may include a transmitting circuit 110 and a receiving circuit 120. The transmitting circuit 110 is arranged for generating a link pulse signal to a second network device 150, wherein the network device 110 and the second network device 150 perform the auto-negotiation of a network connection by using link pulse signals LP1 and LP2 through High Definition Multimedia Interface (HDMI) in order to support the power saving mechanism. The receiving circuit 120 is coupled to the transmitting circuit 110. After the receiving circuit 120 receives the link pulse signal LP2 transmitted from the second network device 150, the network device 100 is controlled to operate under the power saving mechanism. Please note that: in this embodiment, the power saving mechanism is implemented by a power saving mechanism complying with IEEE 802.3az Energy Efficient Ethernet standard (EEE) defined by Institute of Electrical and Electronic Engineers (IEEE), but the disclosure is not limited to this standard.

Please refer to FIG. 1 again. The transmitting circuit 110 may include a link pulse signal generator 112 for converting a first logic level (such as the high logic level "1") of the link pulse signal LP1 into a first voltage level L1, and for converting a second logic level (such as the low logic level "0") of the link pulse signal LP1 into a second voltage level L2. In this embodiment, the link pulse signal generator 112 can be implemented by a digital-to-analog converter (DAC), but this in no way should be considered to be a limitation of the present disclosure.

Figure 2:
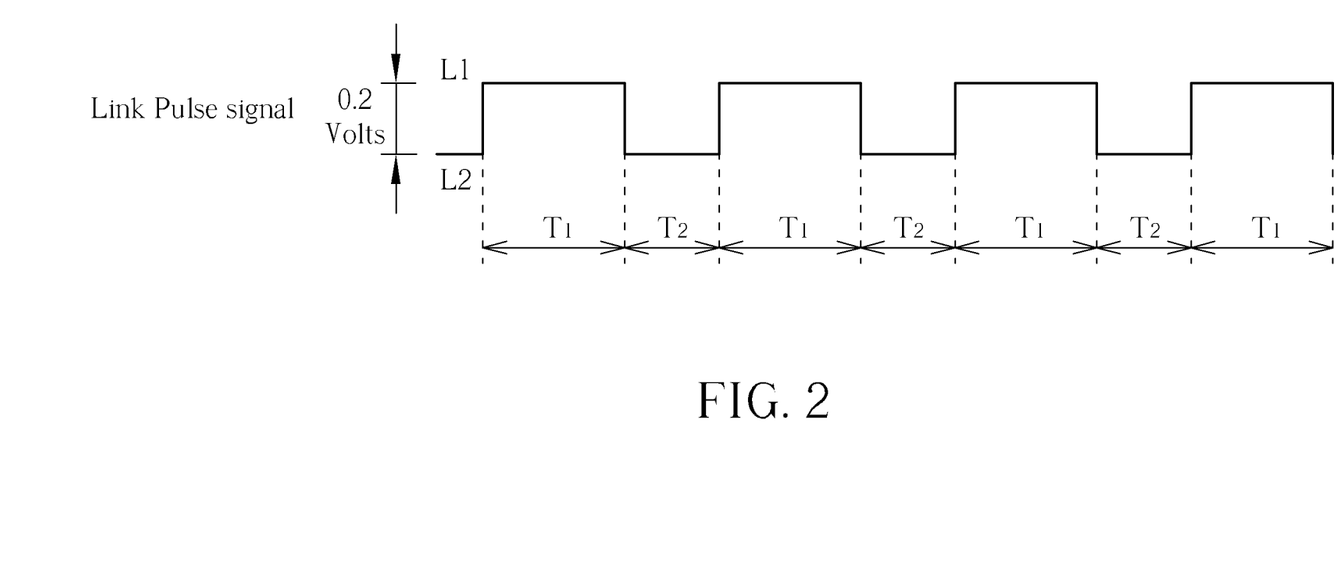
FIG. 2 is a diagram showing a link pulse signal with reference to an embodiment.

Please refer to FIG. 2. FIG. 2 is a diagram showing a link pulse signal with reference to an embodiment. As shown in FIG. 2, the link pulse signal LP1 is a square wave signal, wherein the first logic level indicates a first time length T1 (such as, 100 ns), and the second logic level indicates a second time length T2 (such as, 62.5 μs or 125 μs) being different from the first time length T1. The time length of the link pulse signal LP1 is equal to 100 ns, and the interval between the link pulse signal LP1 is equal to 62.5 μs or 125 μs. What calls for special attention is that: the voltage difference between the first voltage level L1 and the second voltage level L2 is equal to a voltage amplitude supported by the HDMI, such as 0.2 volts.

Figure 3:
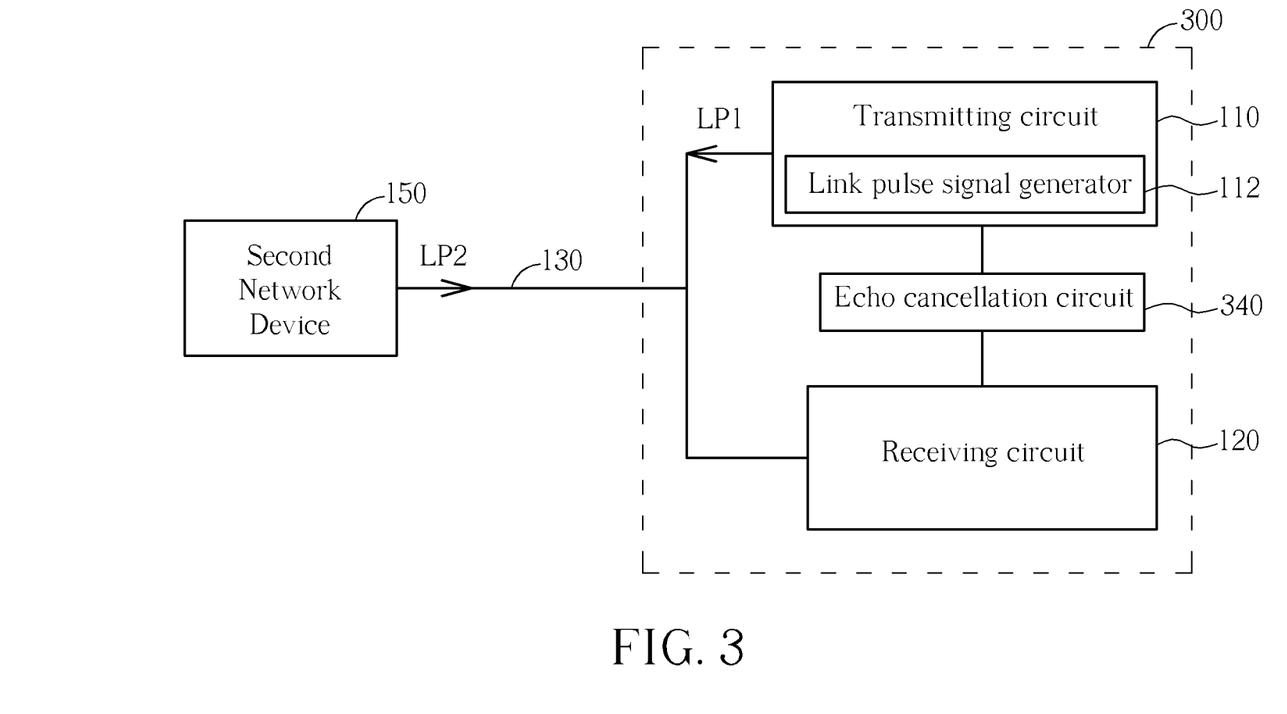
FIG. 3 is a diagram of a network device for supporting a power saving mechanism through an auto-negotiation of HDMI with reference to a second embodiment.

Please refer to FIG. 3. FIG. 3 is a diagram of a network device 300 for supporting a power saving mechanism through an auto-negotiation of HDMI with reference to a second embodiment. The architecture of the network device 300 shown in FIG. 3 is similar to that of the network device 100 shown in FIG. 1, where the difference between them is that: the network device 300 further includes an echo cancellation circuit 340, wherein the echo cancellation circuit 340 is coupled between the transmitting circuit 110 and the receiving circuit 120 for performing an echo cancellation in order to eliminate echoes caused by the link pulse signal LP1 of the transmitting circuit 110. In this embodiment, the echo cancellation circuit 340 can be implemented by a hybrid network device, but this in no way should be considered a limitation of the present disclosure. Any echo cancellation device that can be used for eliminating echoes caused by the link pulse signal LP1 of the transmitting circuit 110 also conforms to the spirit of the present disclosure. Please note that: the operations concerning how the hybrid network device eliminates the echo are well-known to those skilled in the art, and further description is therefore omitted here for brevity.

Figure 4:
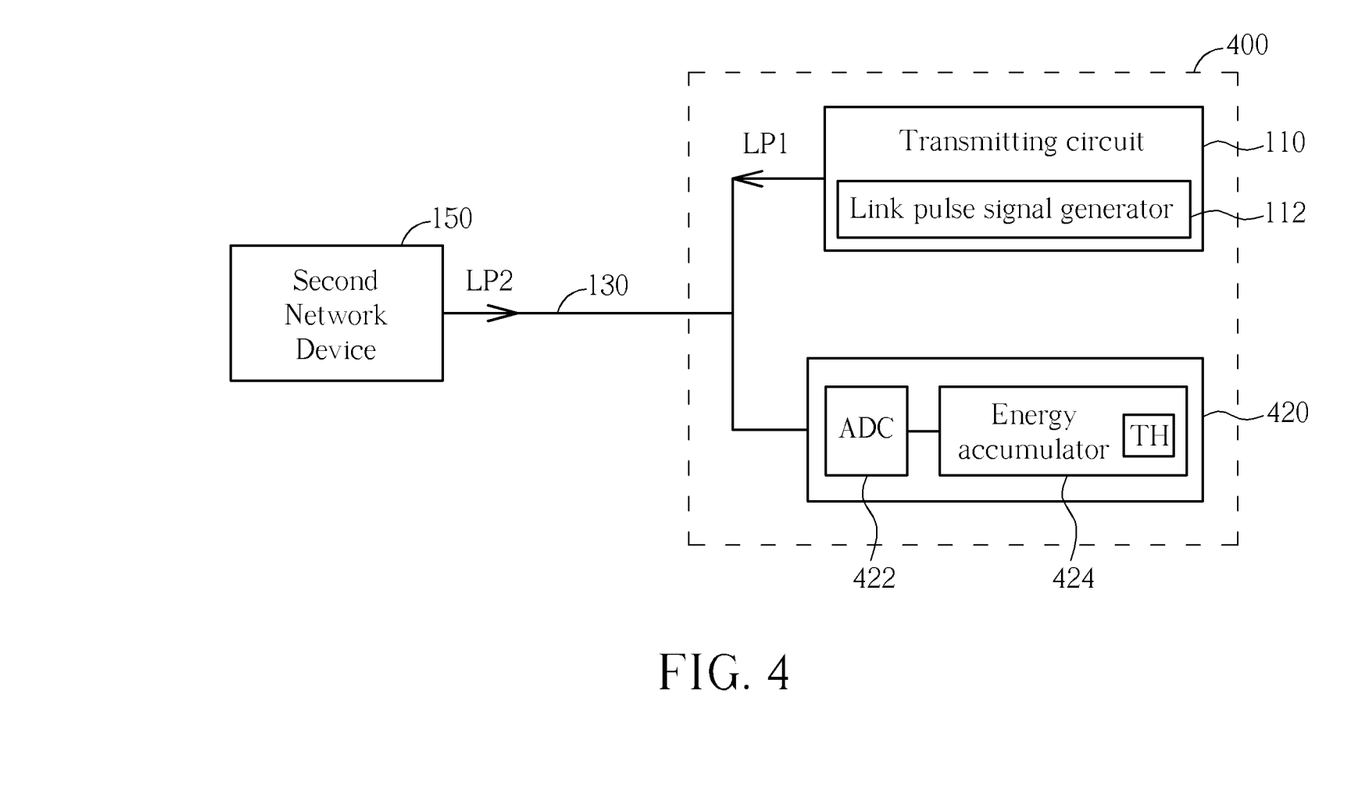
FIG. 4 is a diagram of a network device for supporting a power saving mechanism through an auto-negotiation of HDMI with reference to a third embodiment.

Please refer to FIG. 4. FIG. 4 is a diagram of a network device 400 for supporting a power saving mechanism through an auto-negotiation of HDMI with reference to a third embodiment. The architecture of the network device 400 shown in FIG. 4 is similar to that of the network device 100 shown in FIG. 1, where the difference between them is that: the receiving circuit 420 includes an analog-to-digital converter (ADC) 422 and an energy accumulator 424. The analog-to-digital converter 422 is arranged for converting a first voltage level of a receipt signal received by the receiving circuit 420 into a first logic level, and for converting a second voltage level of the receipt signal received by the receiving circuit 420 into a second logic level. The energy accumulator 424 is coupled to the analog-to-digital converter 422, and is arranged for accumulating energy of the receipt signal and for comparing the accumulated energy with a threshold TH in order to eliminate echoes caused by the link pulse signal LP1 of the transmitting circuit 110.

As an example, the energy of the receipt signal received by the receiving circuit 120 may be accumulated for a period of time (such as, 100 ns) by the energy accumulator 424. Those skilled in the art should easily understand that the energy of the echo caused by the link pulse signal LP1 is smaller than the energy of the link pulse signal LP2 transmitted from the second network device 150 to the receiving circuit 120 through HDMI 130. For this reason, when the accumulated energy of the receipt signal is greater than the threshold TH, it can be determined that the receipt signal is the link pulse signal LP2; when the accumulated energy of the receipt signal is smaller than the threshold TH, it can be determined that the receipt signal is the echo caused by the link pulse signal LP1. Therefore, the interface of the echo caused by the link pulse signal LP1 can be reduced and the accuracy of determining the link pulse signal LP2 can be improved.

Please note that: in this embodiment, the receipt signal first passes through the analog-to-digital converter 422 and then reaches the energy accumulator 424, i.e. the energy accumulator 424 is disposed behind the analog-to-digital converter 422; but the present disclosure is not limited to this only. In other embodiments, the receipt signal can first pass through the energy accumulator 424 and then reach the analog-to-digital converter 422, i.e. the energy accumulator 424 can be disposed ahead of the analog-to-digital converter 422.

Figure 5:
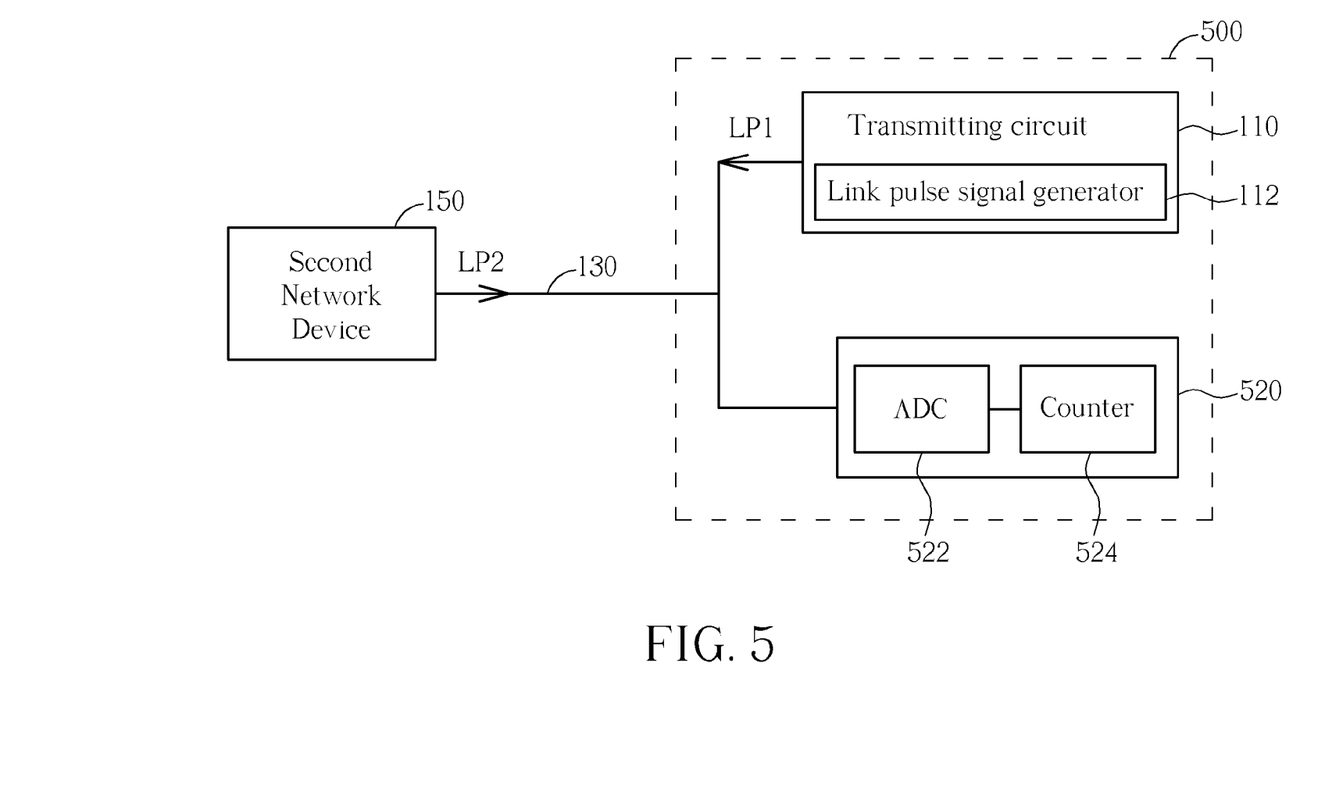
FIG. 5 is a diagram of a network device for supporting a power saving mechanism through an auto-negotiation of HDMI with reference to a fourth embodiment.

Please refer to FIG. 5. FIG. 5 is a diagram of a network device 500 for supporting a power saving mechanism through an auto-negotiation of HDMI with reference to a fourth embodiment. The architecture of the network device 500 shown in FIG. 5 is similar to that of the network device 400 shown in FIG. 4, where the difference between them is that a receiving circuit 520 of the network device 500 includes an analog-to-digital converter 522 and a counter 524. The analog-to-digital converter 522 is arranged for converting a first voltage level of a receipt signal received by the receiving circuit 520 into a first logic level, and for converting a second voltage level of the receipt signal received by the receiving circuit 520 into a second logic level. The counter 524 is coupled to the analog-to-digital converter 522, and is arranged for eliminating echoes caused by the link pulse signal LP1 of the transmitting circuit 110 with reference to a predetermined time length. Please note that: in this embodiment, the predetermined time length may be a time duration starting from when the link pulse signal LP1 is generated by the transmitting circuit 110 to when the echo caused by the link pulse signal LP1 is inputted to the receiving circuit 520. For example, the signal transmission path between the transmitting circuit 110 and the receiving circuit 520 can be viewed as a fixed distance, and thus the time duration of the echo caused by the link pulse signal LP1 being inputted to the receiving circuit 520 can be viewed as a fixed value. For this reason, the timing of the echo caused by the link pulse signal LP1 being inputted into the receiving circuit 520 can be predicted or estimated in advance, and thus the receiving circuit 520 can decide not to judge during the timing that the echo may be caused by the link pulse signal LP1, thereby avoiding the effect of the echo caused by the link pulse signal LP1. This in no way should be considered a limitation of the present disclosure. In other embodiments of the present disclosure, the predetermined time length may be a time duration starting from when a second link pulse signal LP2 transmitted by a second network device 150 to when the receipt signal is received by the receiving circuit 520 of the network device 500. For example, because the interval between the link pulse signals LP2 is a fixed value, the timing when the second network device 150 outputs the next link pulse signal LP2 can be predicted or estimated by the receiving circuit 520 after the first link pulse signal LP2 is received by the receiving circuit 520. Therefore, the receiving circuit 520 can decide not to judge during the timing when the link pulse signal LP2 may occur in order to improve the accuracy of determining the link pulse signal LP2.

Please note that: in this embodiment, the receipt signal first passes through the analog-to-digital converter 522 and then reaches the counter 524, i.e. the counter 524 is disposed behind the analog-to-digital converter 522, but the present disclosure is not limited to this only. In other embodiments of the present disclosure, the receipt signal can first pass through the counter 524 and then reach the analog-to-digital converter 522, i.e. the counter 522 can be disposed ahead of the analog-to-digital converter 522.

The abovementioned embodiments are presented merely to illustrate practicable designs of the present disclosure, and in no way should be considered to be limitations of the scope of the present disclosure. Those skilled in the art should appreciate that various modifications of the network devices 300-500 shown in FIG. 3-FIG. 5 may be made without departing from the spirit of the present disclosure. For example, the network devices 400 and 500 shown in FIG. 4 and FIG. 5 can be arranged or combined randomly into a new varied embodiment, which also belongs to the scope of the present disclosure. In other embodiments of the present disclosure, the receiving circuit may include both the counter and the energy accumulator.

Figure 6:
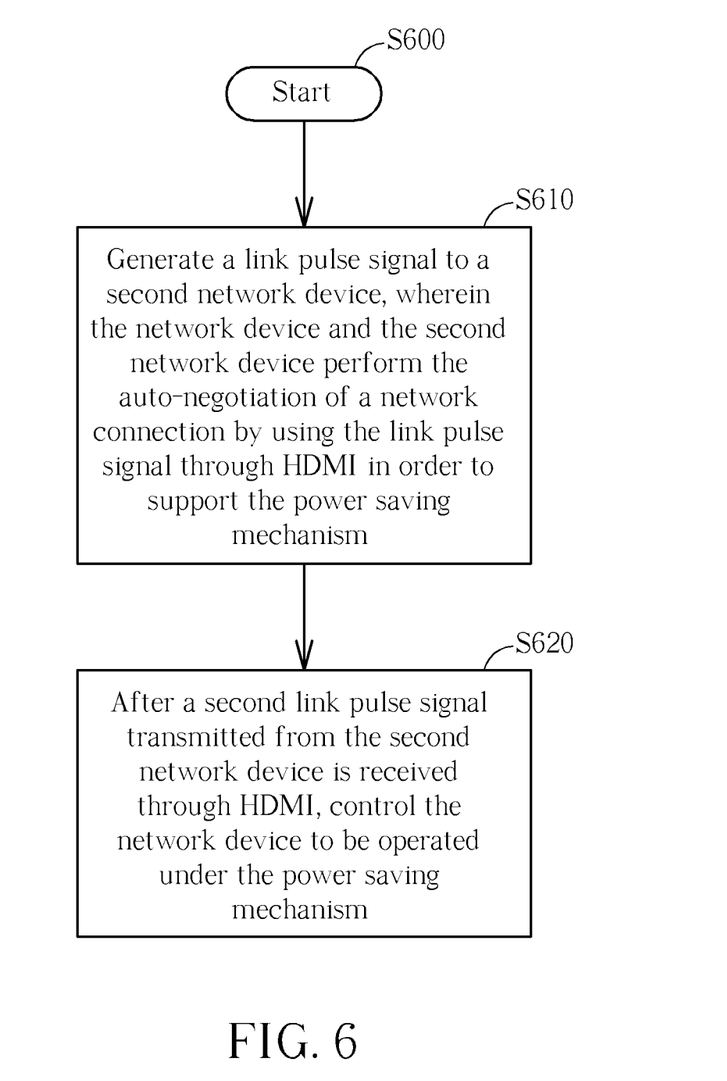
FIG. 6 is a flowchart illustrating a method for supporting a power saving mechanism through an auto-negotiation of HDMI with reference to a first exemplary embodiment.

Please refer to FIG. 6. FIG. 6 is a flowchart illustrating a method for supporting a power saving mechanism through an auto-negotiation of HDMI with reference to a first exemplary embodiment. Please note that the following steps are not limited to be performed with reference to the exact sequence shown in FIG. 6 if a roughly identical result can be obtained. The method may include, but is not limited to, the following steps:

Step S600: Start.

Step S610: Generate a link pulse signal to a second network device, wherein the network device and the second network device perform auto-negotiation of a network connection by using the link pulse signal through HDMI in order to support the power saving mechanism.

Step S620: After a second link pulse signal transmitted from the second network device is received through HDMI, control the network device to be operated under the power saving mechanism.

Those skilled in the art can readily understand how each element operates by combining the steps shown in FIG. 6 and the elements shown in FIG. 1, and further description is omitted here for brevity. Please note that the step S610 is executed by the transmitting circuit 110, and the step S620 is executed by the receiving circuit 120.

Figure 7:
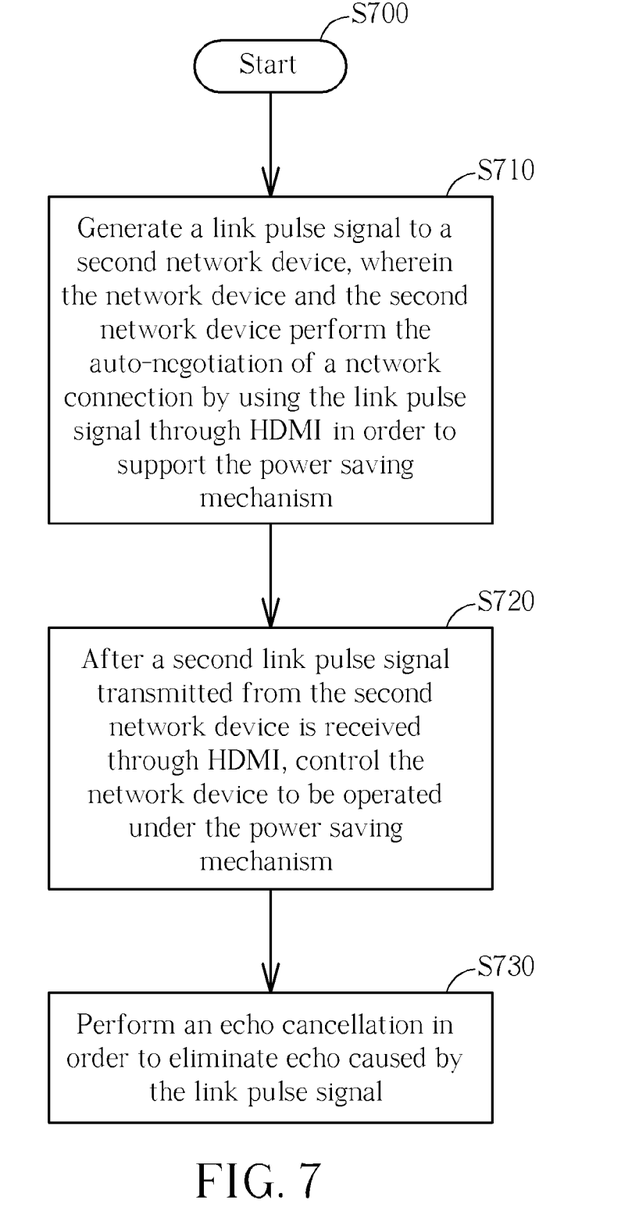
FIG. 7 is a flowchart illustrating a method for supporting a power saving mechanism through an auto-negotiation of HDMI with reference to a second exemplary embodiment.

Please refer to FIG. 7. FIG. 7 is a flowchart illustrating a method for supporting a power saving mechanism through an auto-negotiation of HDMI with reference to a second exemplary embodiment. Please note that the following steps are not limited to be performed with reference to the exact sequence shown in FIG. 7 if a roughly identical result can be obtained. The method may include, but is not limited to, the following steps:

Step S700: Start.

Step S710: Generate a link pulse signal to a second network device, wherein the network device and the second network device perform the auto-negotiation of a network connection by using the link pulse signal through HDMI in order to support the power saving mechanism.

Step S720: After a second link pulse signal transmitted from the second network device is received through HDMI, control the network device to be operated under the power saving mechanism.

Step S730: Perform an echo cancellation in order to eliminate echo caused by the link pulse signal.

Those skilled in the art can readily understand how each element operates by combining the steps shown in FIG. 7 and the elements shown in FIG. 3, and further description is therefore omitted here for brevity. Please note that the step S710 is executed by the transmitting circuit 110, the step S720 is executed by the receiving circuit 120, and the step S730 is executed by the echo cancellation circuit 340.

Figure 8:
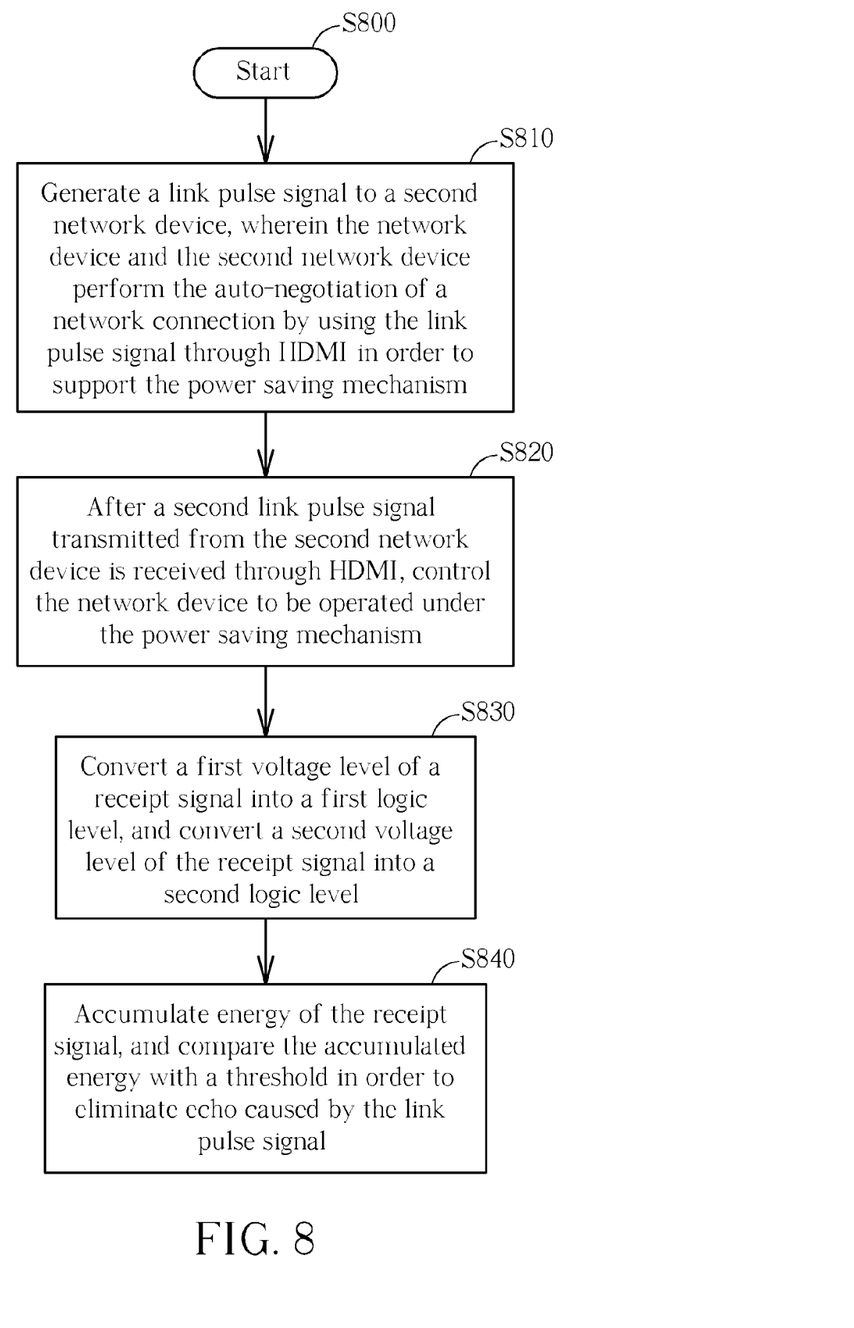
FIG. 8 is a flowchart illustrating a method for supporting a power saving mechanism through an auto-negotiation of HDMI with reference to a third exemplary embodiment.

Please refer to FIG. 8. FIG. 8 is a flowchart illustrating a method for supporting a power saving mechanism through an auto-negotiation of HDMI with reference to a third exemplary embodiment. Please note that the following steps are not limited to be performed with reference to the exact sequence shown in FIG. 8 if a roughly identical result can be obtained. The method may include, but is not limited to, the following steps:

Step S800: Start.

Step S810: Generate a link pulse signal to a second network device, wherein the network device and the second network device perform the auto-negotiation of a network connection by using the link pulse signal through HDMI in order to support the power saving mechanism.

Step S820: After a second link pulse signal transmitted from the second network device is received through HDMI, control the network device to be operated under the power saving mechanism.

Step S830: Convert a first voltage level of a receipt signal into a first logic level, and convert a second voltage level of the receipt signal into a second logic level.

Step S840: Accumulate energy of the receipt signal, and compare the accumulated energy with a threshold in order to eliminate echo caused by the link pulse signal.

Those skilled in the art can readily understand how each element operates by combining the steps shown in FIG. 8 and the elements shown in FIG. 4, and further description is therefore omitted here for brevity. Please note that the step S810 is executed by the transmitting circuit 110, the step S820 is executed by the receiving circuit 420, the step S830 is executed by the analog-to-digital converter 422, and the step S840 is executed by the energy accumulator 424.

Figure 9:
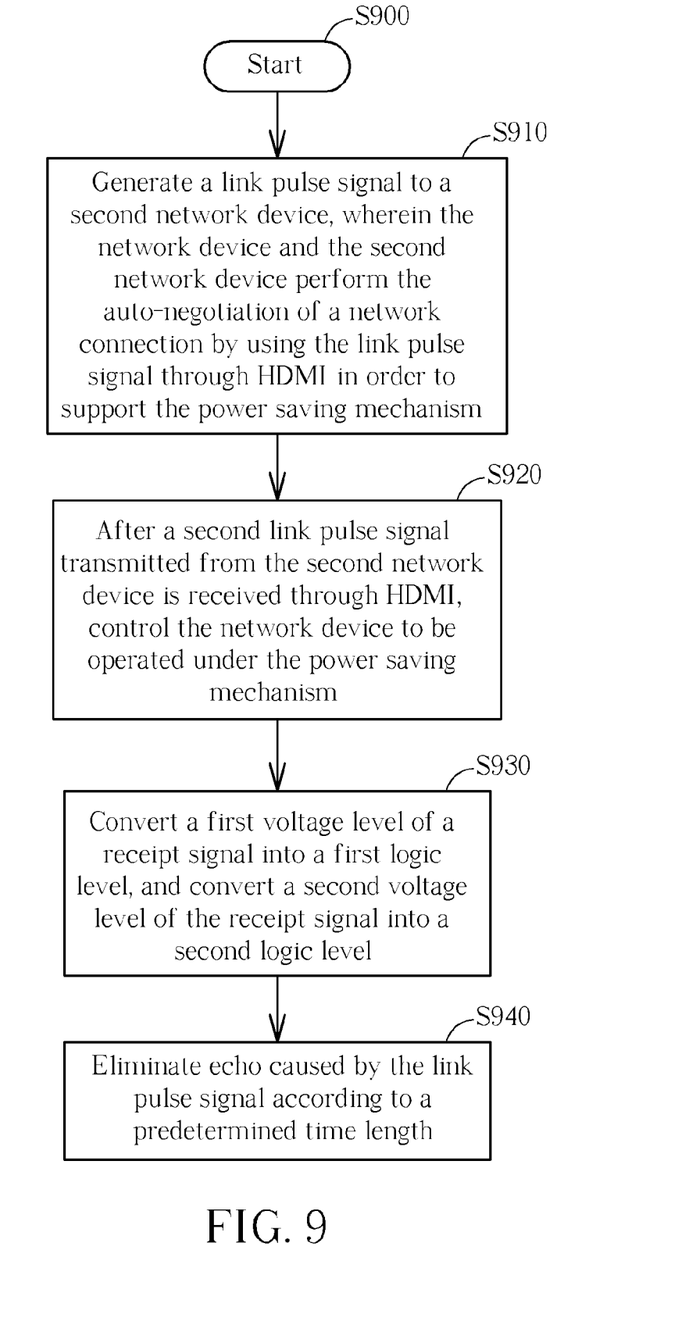
FIG. 9 is a flowchart illustrating a method for supporting a power saving mechanism through an auto-negotiation of HDMI with reference to a fourth exemplary embodiment.

Please refer to FIG. 9. FIG. 9 is a flowchart illustrating a method for supporting a power saving mechanism through an auto-negotiation of HDMI with reference to a fourth exemplary embodiment. Please note that the following steps are not limited to be performed with reference to the exact sequence shown in FIG. 9 if a roughly identical result can be obtained. The method may include, but is not limited to, the following steps:

Step S900: Start.

Step S910: Generate a link pulse signal to a second network device, wherein the network device and the second network device perform the auto-negotiation of a network connection by using the link pulse signal through HDMI in order to support the power saving mechanism.

Step S920: After a second link pulse signal transmitted from the second network device is received through HDMI, control the network device to be operated under the power saving mechanism.

Step S930: Convert a first voltage level of a receipt signal into a first logic level, and convert a second voltage level of the receipt signal into a second logic level.

Step S940: Eliminate echo caused by the link pulse signal with reference to a predetermined time length.

Those skilled in the art can readily understand how each element operates by combining the steps shown in FIG. 9 and the elements shown in FIG. 5, and further description is therefore omitted here for brevity. Please note that the step S910 is executed by the transmitting circuit 110, the step S920 is executed by the receiving circuit 520, the step S930 is executed by the analog-to-digital converter 522, and the step S940 is executed by the counter 524.

Please note that the steps of the abovementioned flowcharts are merely practicable embodiments of the present disclosure, and in no way should be considered to be limitations of the scope of the present disclosure. These methods can include other intermediate steps or several steps can be merged into a single step without departing from the spirit of the present disclosure.

The abovementioned embodiments are presented merely to illustrate technical features of the present disclosure, and in no way should be considered to be limitations of the scope of the present disclosure. In summary, a function of launching an auto-negotiation mechanism by using a self-defined link pulse signal is provided in the present disclosure. Therefore, a power saving mechanism defined by the Institute of Electrical and Electronic Engineers (IEEE) can be supported through HDMI. In addition, an echo cancellation can be performed by using an echo cancellation circuit in order to eliminate echoes caused by the link pulse signal and reduce erroneous judgment rates. The accuracy of determining the link pulse signal outputted from another network device can be improved by using the counter and the energy accumulator.

Those skilled in the art will readily observe that numerous modifications and alterations of the device and method may be made while retaining the teachings of the disclosure.

What is claimed is:

1. A network device for supporting a power saving mechanism through an auto-negotiation (NWAY) of High Definition Multimedia Interface (HDMI), the network device comprising:

a transmitting circuit, arranged for generating a link pulse signal to a second network device, wherein the network device and the second network device perform the auto-negotiation of a network connection by using the link pulse signal through HDMI in order to support the power saving mechanism; and a receiving circuit, coupled to the transmitting circuit, wherein after the receiving circuit receives a second link pulse signal transmitted from the second network device through HDMI, the network device is controlled to be operated under the power saving mechanism.

2. The network device according to claim 1, wherein the transmitting circuit comprises:

a link pulse signal generator, arranged for converting a first logic level of the link pulse signal into a first voltage level, and for converting a second logic level of the link pulse signal into a second voltage level.

3. The network device according to claim 2, wherein the link pulse signal is a square wave signal; the first logic level indicates a first time length, and the second logic level indicates a second time length being different from the first time length.

4. The network device according to claim 2, wherein the link pulse signal generator is a digital-to-analog converter (DAC).

5. The network device according to claim 2, wherein a voltage difference between the first voltage level and the second voltage level is equal to a voltage amplitude supported by the HDMI.

6. The network device according to claim 1, further comprising:

an echo cancellation circuit, coupled between the transmitting circuit and the receiving circuit, arranged for performing an echo cancellation in order to eliminate echo caused by the link pulse signal of the transmitting circuit.

7. The network device according to claim 1, wherein the receiving circuit comprises:

an analog-to-digital converter (ADC), arranged for converting a first voltage level of a receipt signal received by the receiving circuit into a first logic level, and for converting a second voltage level of the receipt signal received by the receiving circuit into a second logic level; and an energy accumulator, arranged for accumulating energy of the receipt signal and for comparing the accumulated energy with a threshold in order to eliminate echo caused by the link pulse signal of the transmitting circuit.

8. The network device according to claim 1, wherein the receiving circuit comprises:

an analog-to-digital converter, arranged for converting a first voltage level of a receipt signal received by the receiving circuit into a first logic level, and for converting a second voltage level of the receipt signal received by the receiving circuit into a second logic level; and a counter, arranged for eliminating echo caused by the link pulse signal of the transmitting circuit with reference to a predetermined time length.

9. The network device according to claim 8, wherein the predetermined time length is a time duration starting from when the link pulse signal is generated by the transmitting circuit to when the echo caused by the link pulse signal is inputted to the receiving circuit.

10. The network device according to claim 1, wherein the power saving mechanism complies with IEEE 802.3az Energy Efficient Ethernet standard (EEE) defined by the Institute of Electrical and Electronic Engineers (IEEE).

11. A network connecting method, applied to a network device, for supporting a power saving mechanism through an auto-negotiation (NWAY) of High Definition Multimedia Interface (HDMI), the method comprising:

generating a link pulse signal to a second network device, wherein the network device and the second network device perform the auto-negotiation of a network connection by using the link pulse signal through HDMI in order to support the power saving mechanism; and after a second link pulse signal transmitted from the second network device is received through HDMI, controlling the network device to be operated under the power saving mechanism.

12. The network connecting method according to claim 11, wherein the step of generating the link pulse signal to the second network device comprises:

converting a first logic level of the link pulse signal into a first voltage level, and converting a second logic level of the link pulse signal into a second voltage level.

13. The network connecting method according to claim 12, wherein the link pulse signal is a square wave signal; the first logic level indicates a first time length, and the second logic level indicates a second time length being different from the first time length.

14. The network connecting method according to claim 12, wherein a voltage difference between the first voltage level and the second voltage level is equal to a voltage amplitude supported by the HDMI.

15. The network connecting method according to claim 11, further comprising:

performing an echo cancellation in order to eliminate echo caused by the link pulse signal.

16. The network connecting method according to claim 11, wherein the step of controlling the network device to be operated under the power saving mechanism comprises:

converting a first voltage level of a receipt signal into a first logic level, and converting a second voltage level of the receipt signal into a second logic level; and accumulating energy of the receipt signal, and comparing the accumulated energy with a threshold in order to eliminate echo caused by the link pulse signal.

17. The network connecting method according to claim 11, wherein the step of controlling the network device to be operated under the power saving mechanism comprises:

converting a first voltage level of a receipt signal into a first logic level, and converting a second voltage level of the receipt signal into a second logic level; and eliminating echo caused by the link pulse signal with reference to a predetermined time length.

18. The network connecting method according to claim 17, wherein the predetermined time length is a time duration of the echo caused by the link pulse signal being inputted to the network device.

19. The network connecting method according to claim 17, wherein the predetermined time length is a time duration starting from when a second link pulse signal transmitted by a second network device to when the receipt signal is received by the network device.

20. The network connecting method according to claim 11, wherein the power saving mechanism complies with IEEE 802.3az Energy Efficient Ethernet standard (EEE) defined by the Institute of Electrical and Electronic Engineers (IEEE).

* * * * *